Sept. 19, 1972    I. KORNSTEIN    3,692,610
METHOD AND APPARATUS FOR MAKING A METALIZED INDICIUM
Filed Sept. 10, 1970
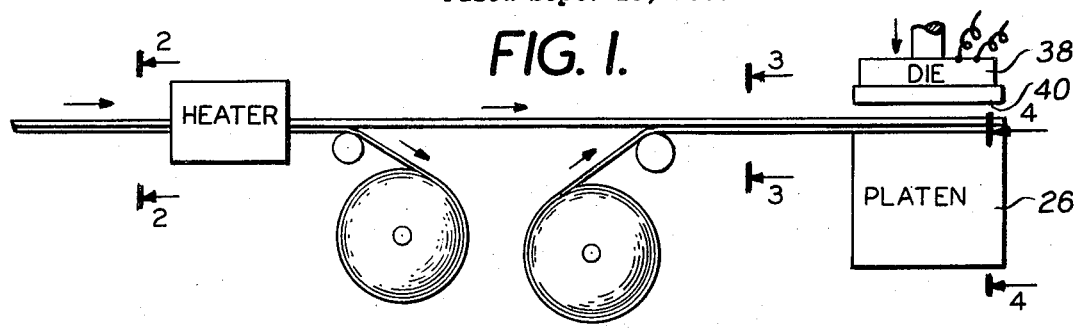
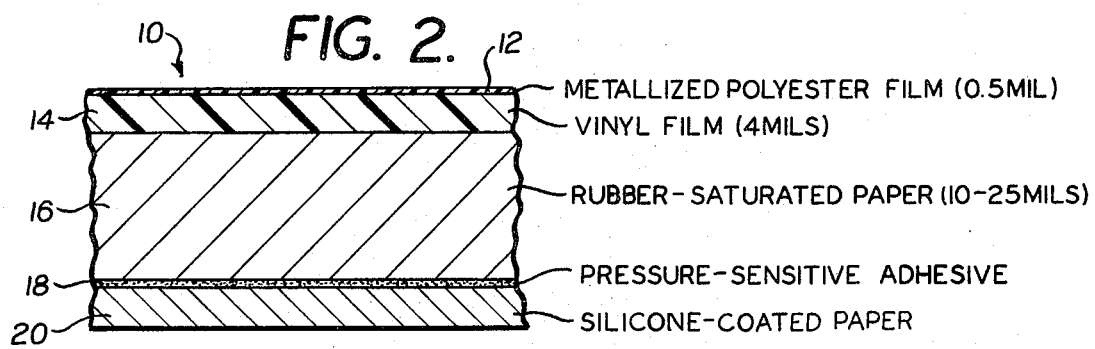
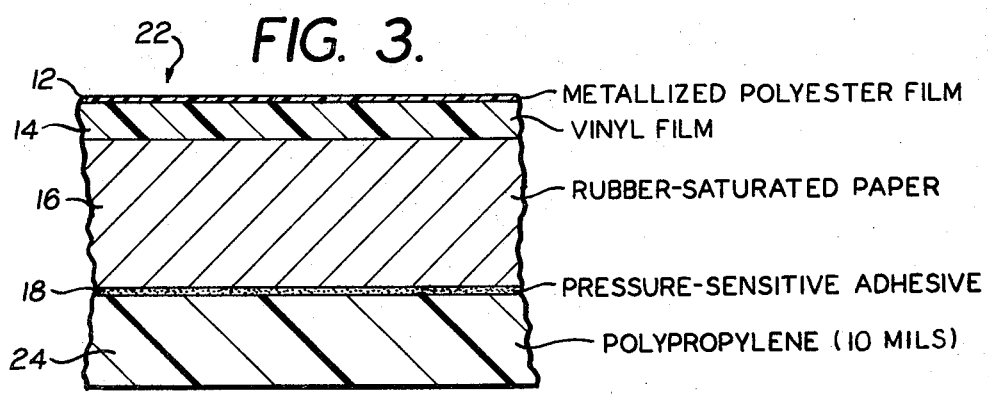
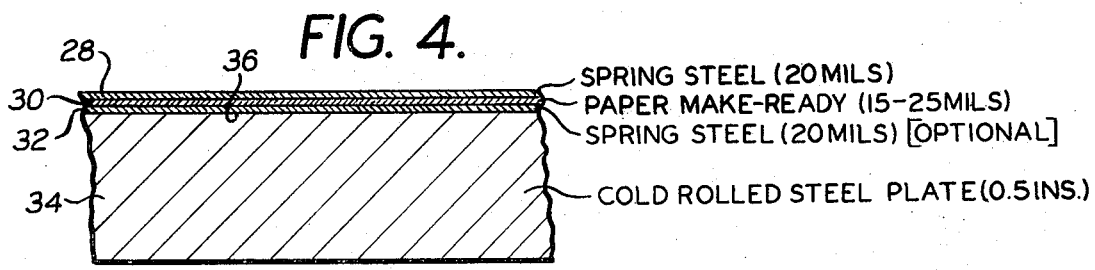
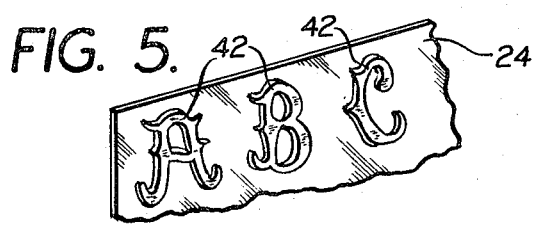
INVENTOR
IRVING KORNSTEIN
BY
Hubbell, Cohen & Stiefel
ATTORNEYS.

3,692,610
METHOD AND APPARATUS FOR MAKING A
METALIZED INDICIUM
Irving Kornstein, 200 Leroy Ave., Tenafly, N.J. 07670
Filed Sept. 10, 1970, Ser. No. 70,951
Int. Cl. B32b 7/06, 3/00
U.S. Cl. 156—249                                    4 Claims

ABSTRACT OF THE DISCLOSURE

A method and apparatus for making a metalized pressure-sensitive adhesive backed indicium from a laminate having a polypropylene backing layer in which the laminate is provided with a metalized polyester film outer layer, a vinyl film interlayer adjacent the metalized film layer, a rubber saturated paper interlayer adjacent the vinyl film interlayer and a pressure-sensitive adhesive interlayer between the vinyl film interlayer and the polypropylene backing layer. The polypropylene backed laminate is provided by replacing a silicone-coated paper backing layer of a starting laminate with the polypropylene backing layer. The indicium is formed by hot-die cutting the polypropylene backed laminate, which has been placed on a platen, with a die which is slightly worn or blunted. The platen is provided with a stacked plurality of sheet-like materials including a first 20 mil spring steel bearing plate upon which the laminate is placed, a second 20 mil spring steel plate, a paper make-ready between the spring steel plates, and a cold-rolled steel underlying plate adjacent the second spring steel plate.

BACKGROUND OF THE INVENTION

Field of the invention

The present invention relates to a method and apparatus for making a metalized pressure-sensitive adhesive backed indicium from a laminate having a polypropylene backing layer.

Description of the prior art

It is well known to make metalized pressure-sensitive adhesive backed indicia from laminates having a metalized polyester film outer layer, a vinyl film interlayer adjacent the metalized film layer, a rubber saturated paper interlayer adjacent the vinyl film interlayer, a pressure-sensitive adhesive interlayer, and a silicone-coated paper backing layer. Silicone-paper backing is normally utilized for such laminates because it will withstand the 400° Fahrenheit heating temperature needed to drive the solvents from the pressure-sensitive adhesive. However, such silicone-paper backing does not provide a strong adhesive bond with the pressure-sensitive adhesive interlayer of the laminate and considerable problems may result due to this, such as accidental removal of the metalized indicia from the silicone-paper backing before desired for use. Furthermore, great care must be taken when hot-die cutting a laminate having a silicone-paper backing as burning can result from the adhering of the laminate to the heated die.

A platen is normally utilized to support the laminate during the die cutting operation utilized in forming the metalized indicia. Such platens normally consist of one solid plate of material, such as steel. When such a single plate is utilized, considerable care must be taken to ensure that the surface of the platen upon which the laminate is supported during cutting is uniform throughout so that irregularities do not result in the depth of the cut along various portions of the particular indicium being die cut. If such care is not taken, the indicium may not be completely formed at the end of the die cutting operation.

The present invention overcomes these disadvantages of the prior art.

SUMMARY OF THE INVENTION

A laminate capable of making a metalized pressure-sensitive adhesive backed indicium therefrom is provided which has a metalized polyester-like film outer layer, a vinyl-like film interlayer adjacent the metalized film layer, a rubber-like saturated paper interlayer adjacent the vinyl-like film interlayer, a pressure-sensitive adhesive interlayer adjacent the rubber-like saturated paper interlayer, and a polypropylene backing layer adjacent the pressure-sensitive adhesive interlayer. In forming such a laminate a starting material laminate which is identical therewith except for the provision of a silicone-coated paper backing layer in place of the polypropylene backing layer is utilized. The silicone-coated paper backing layer is replaced by the polypropylene backing layer prior to the actual formation of the metalized pressure-sensitive adhesive backed indicia, such as by stripping the silicone-coated paper backing layer from the starting laminate and substituting therefore the polypropylene backing layer. The polypropylene-backed laminate is hot die cut on a platen having a spring steel bearing plate stacked upon a cold rolled steel underlying plate. A paper make-ready and a second spring steel bearing plate are also provided between the spring steel bearing plate and the cold rolled steel underlying plate to minimize the non-uniformities in the underlying plate during the die cutting of the laminate.

BRIEF DESCRIPTION OF DRAWING

FIG. 1 is a diagrammatic illustration of the method of the present invention;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1; and

FIG. 5 is a fragmentary view in perspective of a metalized indicia laminate produced in accordance with the preferred method of the present invention.

DETAILED DESCRIPTION OF THE PREFERRED EMBODIMENT

Referring now to the drawing in detail, and especially to FIGS. 1 and 2, thereof, as shown and preferred, the starting material utilized in performing the preferred method of the present invention is a laminate, generally referred to by the reference numeral 10 having, from top to bottom, a metalized polyester film outer layer 12, a vinyl film interlayer 14, a rubber-saturated paper interlayer 16, a pressure-sensitive adhesive interlayer 18, and a silicone-coated paper backing layer 20.

The metalized polyester film layer 12 which is a polyester such as Mylar (polyethylene terephthalate), preferably has a thickness in the range of one-quarter mil to three mils. Most preferably, the polyester layer 12 has a thickness of 0.5 mils. If desired, the polyester film layer 12 could be replaced by a vinyl or acetate layer. However, if vinyl were utilized in lieu thereof, the desired thickness thereof would preferably be between 2 mils and 10 mils. If acetate were utilized in lieu thereof, the desired thickness thereof would preferably be between 1 mil and 3 mils. Furthermore, the vinyl film interlayer 14, which is a vinyl such as polyvinylchloride, preferably has a thickness in the range of 2 mils to 20 mils. Most preferably, this vinyl interlayer 14 has a thickness of 4 mils. With respect to the rubber-saturated paper interlayer 16, any natural or synthetic rubbers, such as neoprene saturated papers could be utilized therefor, such as ethylene/propylene copolymer rubber, ethylene/propylene/terepolymer rubber or ABS rubber. If desired, a vinyl film or a vinyl sheet could be utilized therefor. Preferably, the rubber-saturated paper interlayer has a thickness in the range of 10 mils to 25 mils. Finally, the pressure-sensitive adhesive interlayer 18, which is an adhesive such as an acrylic base pressure-sensitive, preferably has a thickness of 1 mil.

Referring now to FIG. 3 the final laminate, generally referred to by reference numeral 22, from which a metalized indicium, such as a letter in the alphabet, is formed is shown. The manner of producing the final laminate 22 will be described in greater detail hereinafter. This laminate 22 is preferably identical with the starting laminate 10 except for the substitution therein of a polypropylene backing layer 24 for paper backing layer 20. Preferably, polypropylene backing layer 24 has a thickness greater than the thickness of the silicone-coated paper backing layer 20 of the starting laminate 10. Most preferably, the polypropylene backing layer has a thickness of 10 mils.

In performing the preferred method of the present invention the starting laminate 10, which is a commercially available product, has the silicone-coated paper backing layer 20 stripped off, such as by a doctor blade (not shown), and the polypropylene backing layer 24 substituted therefor to create the final laminate 22 shown in FIG. 3. When the silicone-coated paper backing layer 20 is stripped off the starting laminate 10, a portion of the pressure-sensitive adhesive interlayer 18 is exposed. The polypropylene backing layer 24 is applied to this exposed portion, thereby replacing the silicone-coated paper backing layer 20.

The final laminate 22 is then placed upon a platen 26 shown in greater detail in FIG. 4. Preferably the platen 26 includes a stacked plurality of sheet-like materials including, from top to bottom, a bearing plate 28 preferably formed of spring steel, a conventional paper make-ready 30 underlying the spring steel bearing plate 28, another plate 32 also preferably formed of spring steel, and an underlying plate 34 preferably formed of cold rolled steel. The spring steel plates 28 and 32, preferably, each have a thickness of 20 mils, the paper make-ready 30 has a preferred thickness in the range of 15 to 25 mils, and the cold rolled steel underlying plate 34 preferably has a thickness of 0.5 inch. The preferred platen configuration 26 minimizes any non-uniformities in the top surface 36 of the cold rolled steel underlying plate 34 when pressure is applied thereto such as in a die cutting operation, to be described in greater detail hereinafter. If desired the paper make-ready underlying layer 30 and the second spring steel underlying layer 32 may be omitted if the occurrence of these non-uniformities is not very critical. Furthermore, if it is not desired to compensate for the occurrence of non-uniformities at all, a conventional platen could be substituted for the platen configuration 26 of FIG. 4.

In performing the preferred method of the present invention, a hot-die cutting operation is utilized in order to provide metalized indicia from the final laminate configuration 22. Most preferably the die 38 which is used in this operation is slightly worn or blunted. If a new die 38 is utilized in performing the hot-die cutting operation in accordance with the preferred method of the present invention, the die 38 should preferably be operated without the final laminate 22 in position for a period sufficient to slightly dull the die cutting surface 40. The die 38 is preferably formed of cold rolled carbon steel. Preferably, the die 38 has a depth which is significantly greater than the thickness of the starting laminate 10 in the absence of the backing layer 20, in order to prevent the occurrence of undesirable phenomena such as burning. Most preferably, the die 38 has a depth of .0035 inch to .01 inch for a laminate having the preferred thickness illustrated in FIG. 3.

In performing the preferred method, the die 38 is heated to a temperature of 400° Fahrenheit by conventional means such as electrical means (not shown). If desired, the die 38 could be heated to a temperature in the range of 250° Fahrenheit to 400° Fahrenheit and acceptable results still obtained. However, the most desirable results are obtained at a die temperature of 400° Fahrenheit. During the hot die cutting operation, the die 38 is preferably applied to the final laminate 22 at a pressure substantially equivalent to 50,000 pounds per square inch. (50,000 p.s.i.)

After the occurrence of the hot-die cutting operation, the balance of the unwanted final laminate 22, not including the polypropylene backing layer 24, is preferably stripped off. If desired, the stripping off of the unwanted portion of the final laminate 22 can be accomplished in a conventional manner such as by a doctor blade (not shown). This leaves a pressure-sensitive adhesive backed metalized indicium 42, or group of indicia 42—42, adhered to the polypropylene backing layer 24, such as illustrated in FIG. 5. When it is desired to utilize a metalized indicium 42 it may be readily removed from the polypropylene backing layer 24, such as by peeling.

Summarizing the preferred method of the present invention the following operations are performed. The starting laminate 10 is provided and the silicone-coated paper backing layer 20 is stripped off. Te polypropylene backing layer 24 is then substituted for the removed silicone-coated paper backing layer 20 so as to form the final laminate 22. The final laminate 22 is then hot-die cut at a preferred temperature of 400° Fahrenheit and a preferred pressure of 50,000 p.s.i. to form a metalized indicium 42. The unwanted portions of the final laminate 22 are then stripped off in order to leave a pressure-sensitive adhesive backed metalized indicium 42, or group of indicia 42—42, located on the polypropylene backing layer 24.

By performing the method of the present invention a metalized indicium laminate is provided which facilitates die cutting and provides good adhesion with the pressure-sensitive adhesive of such a laminate. Furthermore, in utilizing the preferred platen configuration, non-uniformities in the top surface of the platen may be minimized during the die cutting operation.

It is to be understood that the above described embodiment of the invention is merely illustrative of the principles thereof and that numerous modifications and embodiments of the invention may be derived within the spirit and scope thereof.

What is claimed is:

1. A method of making a metalized pressure-sensitive adhesive backed indicium from a starting material laminate having a metalized polyester-like film outer layer, a vinyl-like film interlayer adjacent said metalized film layer, a rubber-like saturated paper interlayer adjacent said vinyl-like film interlayer, a pressure-sensitive adhesive interlayer adjacent said rubber-like saturated paper interlayer, and a silicon-coated paper backing layer adjacent said pressure-sensitive adhesive interlayer, comprising the steps of stripping said silicone-coated paper backing layer from said laminate to expose a portion of said pressure-sensitive adhesive interlayer, applying a polypropylene backing layer to said exposed pressure-sensitive adhesive interlayer portion to form a polypropylene backed laminate, hot die cutting said polypropylene backed laminate at a temperature of about 400 degrees Fahrenheit from said metalized film outer layer to said backing layer to form said indicium, and stripping off from said hot die cut laminate backing layer all portions of said laminate other than said portions comprising said indicium to form said metalized pressure-sensitive adhesive interlayer, comprising the steps metalized polyester-like film outer layer, a vinyl-like film interlayer adjacent said metalized film layer, a rubber-like saturated paper interlayer adjacent said vinyl-like film interlayer, and a pressure-sensitive adhesive bottom layer adjacent said rubber-like saturated paper interlayer removably mounted on said polypropylene backing layer by said pressure-sensitive adhesive bottom layer.

2. A method in accordance with claim 1 wherein said hot die cutting is at a pressure of substantially 50,000 p.s.i. on said polypropylene backed laminate.

3. A method in accordance with claim 1 wherein said hot die cutting step includes
heating a die which is at least slightly dulled to said cutting temperature and hot die cutting therewith.

4. A method in accordance with claim 1 wherein said hot die cutting step includes the additional steps of
heating a die to said cutting temperature;
placing said polypropylene backed laminate on a spring steel-bearing plate stacked on at least a cold rolled steel underlying plate underlying said bearing plate and located beneath said die; and
applying said heated die to said polypropylene backed laminate at a desired pressure.

References Cited
UNITED STATES PATENTS

| | | | |
|---|---|---|---|
| 3,036,945 | 5/1962 | Souza | 161—406 |
| 3,144,372 | 8/1964 | Peterson et al. | 156—251 |
| 2,729,010 | 1/1956 | Markus et al. | 156—251 |
| 3,026,233 | 3/1962 | Scholl et al. | 161—160 |
| 3,297,508 | 1/1967 | Jahp | 156—249 |
| 3,520,755 | 7/1970 | Scholl et al. | 156—251 |

DOUGLAS J. DRUMMOND, Primary Examiner

U.S. Cl. X.R.

156—251, 344; 161—406